(12) United States Patent
Hashimoto et al.

(10) Patent No.: US 6,519,389 B1
(45) Date of Patent: Feb. 11, 2003

(54) METHOD OF MAKING DIFFRACTION GRATING DEVICE, DIFFRACTION GRATING DEVICE, AND APPARATUS FOR MAKING THE SAME

(75) Inventors: Ken Hashimoto, Yokohama (JP); Akira Inoue, Yokohama (JP); Masaki Ohmura, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 87 days.

(21) Appl. No.: 09/722,048

(22) Filed: Nov. 27, 2000

(30) Foreign Application Priority Data

Nov. 25, 1999 (JP) .......................................... 11-334378

(51) Int. Cl.[7] ................................................ G02B 6/34
(52) U.S. Cl. ......................................... 385/37; 430/290
(58) Field of Search ................... 385/37, 123; 430/290, 430/321; 359/123, 135, 124, 127, 140, 138, 173, 566, 18, 17

(56) References Cited

U.S. PATENT DOCUMENTS

| | | | | |
|---|---|---|---|---|
| 5,691,831 A | * | 11/1997 | Taki | ........................... 235/457 |
| 5,694,502 A | * | 12/1997 | Byron | ......................... 385/37 |
| 6,130,973 A | * | 10/2000 | Lauzon et al. | ................ 385/37 |
| 6,292,282 B1 | * | 9/2001 | Mossberg et al. | ........... 359/123 |
| 6,298,183 B1 | * | 10/2001 | Yamauchi et al. | ............ 385/37 |
| 6,310,996 B1 | * | 10/2001 | Byron | ......................... 385/37 |
| 6,370,301 B1 | * | 4/2002 | Kokura | ....................... 359/566 |

\* cited by examiner

Primary Examiner—Ellen E. Kim
(74) Attorney, Agent, or Firm—McDermott, Will & Emery

(57) ABSTRACT

The present invention relates to a method of making a diffraction grating device, in which an optical waveguide is irradiated, by way of a phase grating, with light capable of inducing a refractive index modulation in an optical waveguide region of the optical waveguide so as to form a diffraction grating in the optical waveguide region. In the present invention, when modulating the refractive index of the optical waveguide region of an optical fiber, the intensity of refractive index modulation inducing light emitted from a laser light source so as to irradiate the phase grating is adjusted according to individual positions on the phase grating. Alternatively, the scanning speed of a mirror scanned by a stage is adjusted according to the individual positions on the phase grating. Here, the amount of irradiation of refractive index modulation inducing light at each position on the phase grating is adjusted so as to cancel the diffraction efficiency distribution of phase grating. The present invention can make a diffraction grating device having a desirable characteristic even when the diffraction efficiency distribution of phase grating deviates from its desirable distribution.

15 Claims, 7 Drawing Sheets

METHOD OF MAKING DIFFRACTION GRATING DEVICE, DIFFRACTION GRATING DEVICE, AND APPARATUS FOR MAKING THE SAME

BACKGROUND OF THE INVENTION

1. Field of the Invention

The present invention relates to a method of making a diffraction grating device in which an optical waveguide is irradiated, by way of a phase grating, with light capable of inducing a refractive index modulation in an optical waveguide region of the optical waveguide so as to form a diffraction grating in the optical waveguide region; the diffraction grating device made by this method; and an apparatus for making the same.

2. Related Background Art

Diffraction grating device has diffraction grating formed in optical waveguide region of optical waveguide (encompassing both optical fiber and planar optical waveguide) and is used as optical filter and the like. Such a diffraction grating device is manufactured as follows. Namely, by way of a phase grating, an optical waveguide is irradiated with a predetermined wavelength of light capable of inducing a refractive index modulation (which is ultraviolet light in general, and will hereinafter be referred to as "refractive index modulation inducing light"). Then, interference fringes of the refractive index modulation inducing light are generated in an optical waveguide region of the optical waveguide. Hence, the refractive index at a predetermined part of the optical waveguide region provided with the interference fringes is modulated, whereby a diffraction grating is formed.

Here, laser light emitted from a light source such as a KrF laser light source, which outputs the refractive index modulation inducing light, has a luminous flux diameter smaller than the length of the diffraction grating to be manufactured. As a consequence, a diffraction grating having a desirable length is made when the refractive index modulation inducing light is made incident on the phase grating while being scanned in a longitudinal direction of the optical waveguide.

SUMMARY OF THE INVENTION

The inventors have studied the conventional technique mentioned above and, as a result, have found a problem as follows. Namely, when making a diffraction grating, e.g., when making a uniform diffraction grating, a phase grating having a uniform diffraction efficiency distribution within a plane should be used. However, since the diffraction efficiency distribution of phase grating is not always set uniformly within a plane, a nonuniform diffraction grating may be made even if a uniform diffraction grating is intended to be made. Thus, the above-mentioned conventional technique has been problematic in that diffraction grating having desirable characteristics cannot be made if the diffraction efficiency distribution of a phase grating deviates from its desirable distribution.

For overcoming the above-mentioned problem, it is an object of the present invention to provide a method of making a diffraction grating device which can make a diffraction grating having a desirable characteristic even when the diffraction efficiency distribution of phase grating deviates from a desirable distribution, the diffraction grating device made by this method, and an apparatus for making the same.

The present invention provides a method of making a diffraction grating device, in which an optical waveguide is irradiated, by way of a phase grating, with refractive index modulation inducing light capable of inducing a refractive index modulation in an optical waveguide region of the optical waveguide so as to form a diffraction grating in the optical waveguide region; the method comprising: (1) a diffraction efficiency distribution measuring step of measuring a diffraction efficiency distribution of the phase grating; and (2) a refractive index modulating step of irradiating the optical waveguide with the refractive index modulation inducing light by way of the phase grating with an amount of irradiation of the refractive index modulation inducing light at each position on the phase grating being adjusted according to the diffraction efficiency distribution measured in the diffraction efficiency distribution measuring step, so as to modulate a refractive index of the optical waveguide region.

Preferably, in the method of making a diffraction grating device in accordance with the present invention, the diffraction efficiency distribution measuring step is carried out prior to the refractive index modulating step. Alternatively, it is preferred that the diffraction efficiency distribution measuring step be carried out simultaneously with the refractive index modulating step, and that the amount of irradiation of refractive index modulation inducing light at each position on the phase grating be feedback-controlled according to the diffraction efficiency distribution of phase grating measured in the diffraction efficiency distribution measuring step.

In the method of making a diffraction grating device in accordance with the present invention, it is preferred that the refractive index modulation inducing light be made incident on the phase grating while being scanned in a longitudinal direction of the optical waveguide in the refractive index modulating step, and that the intensity of the refractive index modulation inducing light irradiating each position on the phase grating be adjusted upon the scanning.

In the method of making a diffraction grating device in accordance with the present invention, it is preferred that the refractive index modulation inducing light be made incident on the phase grating while being scanned in a longitudinal direction of the optical waveguide in the refractive index modulating step, and that the scanning speed of the refractive index modulation inducing light irradiating each position on the phase grating be adjusted upon the scanning.

The present invention provides a diffraction grating device made by the above-mentioned method of making a diffraction grating device.

The present invention provides an apparatus for making a diffraction grating device, in which an optical waveguide is irradiated, by way of a phase grating, with refractive index modulation inducing light capable of inducing a refractive index modulation in an optical waveguide region of the optical waveguide so as to form a diffraction grating in the optical waveguide region; the apparatus comprising: (1) diffraction efficiency distribution measuring means for measuring a diffraction efficiency distribution of the phase grating; and (2) refractive index modulating means for irradiating the optical waveguide with the refractive index modulation inducing light by way of the phase grating with an amount of irradiation of the refractive index modulation inducing light at each position on the phase grating being adjusted according to the diffraction efficiency distribution measured by the diffraction efficiency distribution measuring means, so as to modulate a refractive index of the optical waveguide region.

Preferably, in the apparatus for making a diffraction grating device in accordance with the present invention, the diffraction efficiency distribution measuring means measures the diffraction efficiency distribution of the phase grating before the refractive index modulating means irradiates the phase grating with the refractive index modulation inducing light. Alternatively, it is preferred that the diffraction efficiency distribution measuring means measure the diffraction efficiency distribution of phase grating at the same time when the refractive index modulating means irradiates the phase grating with the refractive index modulation inducing light, and that the refractive index modulating means feedback-control the amount of irradiation of refractive index modulation inducing light at each position on the phase grating according to the diffraction efficiency distribution of phase grating measured by the diffraction efficiency distribution measuring means.

In the apparatus for making a diffraction grating device, the refractive index modulating means may comprise irradiating means for making the refractive index modulation inducing light incident on the phase grating while scanning the refractive index modulation inducing light in a longitudinal direction of the optical waveguide, and irradiation intensity adjusting means for adjusting the intensity of the refractive index modulation inducing light irradiating each position on the phase grating when the refractive index modulation inducing light is scanned by the irradiating means.

In the apparatus for making a diffraction grating device, the refractive index modulating means may comprise irradiating means for making the refractive index modulation inducing light incident on the phase grating while scanning the refractive index modulation inducing light in a longitudinal direction of the optical waveguide, and scanning speed adjusting means for adjusting the scanning speed of the refractive index modulation inducing light irradiating each position on the phase grating when the refractive index modulation inducing light is scanned by the irradiating means.

The present invention provides an apparatus for making a diffraction grating device, in which a diffraction grating is made in an optical waveguide region of an optical waveguide, the apparatus comprising: (1) a light source for emitting refractive index modulation inducing light capable of inducing a refractive index modulation in the optical waveguide region; (2) a phase grating for diffracting the refractive index modulation inducing light emitted from the light source; (3) a mirror for reflecting the refractive index modulation inducing light emitted from the light source so as to make the refractive index modulation inducing light incident on the phase grating; (4) a moving unit for moving the mirror along a longitudinal direction of the optical waveguide; and (5) an irradiation intensity control unit for controlling the irradiation intensity of the refractive index modulation inducing light emitted from the light source.

The present invention provides an apparatus for making a diffraction grating device, in which a diffraction grating is made in an optical waveguide region of an optical waveguide, the apparatus comprising: (1) a light source for emitting refractive index modulation inducing light capable of inducing a refractive index modulation in the optical waveguide region; (2) a phase grating for diffracting the refractive index modulation inducing light emitted from the light source; (3) a mirror for reflecting the refractive index modulation inducing light emitted from the light source so as to make the refractive index modulation inducing light incident on the phase grating; (4) a moving unit for moving the mirror along a longitudinal direction of the optical waveguide; and (5) a speed control unit for controlling, according to a diffraction efficiency distribution of the phase grating, the moving speed of the mirror moved by the moving unit.

The apparatus for making a diffraction grating device in accordance with the present invention may further comprise a light-receiving device provided so as to sandwich the phase grating between the light-receiving device and the mirror.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

In the following, embodiments of the present invention will be explained in detail with reference to the accompanying drawings. In the explanation of drawings, constituents identical to each other will be referred to with numerals or letters identical to each other, without repeating their overlapping descriptions. Though the following explanation mainly relates to cases where an optical fiber is employed as an optical waveguide, it is similarly applicable to planar optical waveguides formed on planar substrates.

To begin with, a first embodiment of the method of making a diffraction grating device in accordance with the present invention, diffraction grating device made by this method, and apparatus for making the same will be explained.

Figure 1:
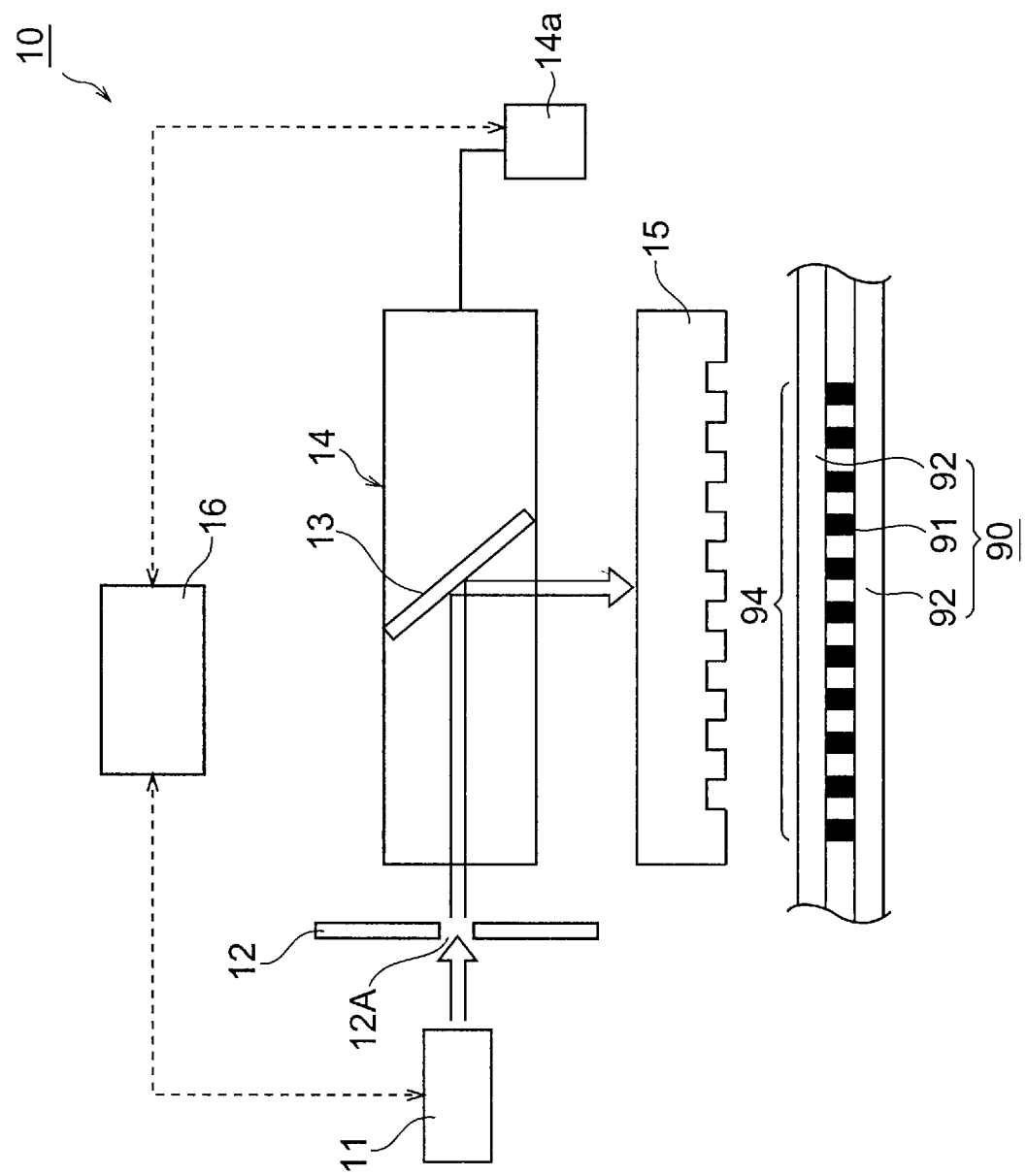
FIG. 1 is a diagram schematically showing the apparatus for making a diffraction grating device in accordance with a first embodiment.

FIG. 1 is a diagram schematically showing an apparatus 10 for making a diffraction grating device in accordance with the first embodiment. This apparatus 10 comprises a laser light source 11, a slit 12, a mirror 13, a stage 14 equipped with a motor 14a, a phase grating 15, and a control unit 16 for controlling the apparatus 10. This apparatus 10 is configured such that an optical fiber (optical waveguide) 90 to be formed with a diffraction grating is disposed directly under the phase grating 15.

The optical fiber 90 has a core region 91 located at the center thereof, and a cladding region 92 surrounding the core region 91. Though the light guided through the optical fiber 90 propagates while being confined in the core region 91, a part of the energy of light also exists in the cladding region 92 in the vicinity of the core region 91. Namely, the optical waveguide region of the optical fiber 90 is constituted by the core region 91 and the part of cladding region 92 in the vicinity of the core region 91. While the optical fiber 90 is mainly composed of silica glass, the optical waveguide region (at least the core region 91) is doped with $GeO_2$. As a consequence, if the optical fiber 90 is irradiated with refractive index modulation inducing light, then the refractive index of the region doped with $GeO_2$ is modulated according to the intensity of irradiation.

The laser light source 11 is a light source for outputting the refractive index modulation inducing light. As the light source, an excimer laser light source (e.g., KrF laser light source or the like) capable of emitting ultraviolet laser light is suitably used. Preferably, the intensity of refractive index modulation inducing light emitted from the laser light source 11 is variable.

Of the refractive index modulation inducing light outputted from the laser light source 11, the part entering an opening 12A of the slit 12 passes therethrough so as to be made incident on the mirror 13. The mirror 13 reflects the refractive index modulation inducing light passed through the opening 12A of slit 12, so as to make it incident on the phase grating 15. The mirror 13 can be moved in the longitudinal direction of the optical fiber 90 by the stage 14 having the motor 14a. When the mirror 13 is moved as such, the refractive index modulation inducing light can be made incident on the phase grating 15 while being scanned in the longitudinal direction of the optical fiber 90.

The phase grating 15 is formed with projections and depressions having a predetermined period on the side (where the optical fiber 90 is placed) opposite from the side on which the refractive index modulation inducing light reflected by the mirror 13 is incident, and diffracts the incident refractive index modulation inducing light. Also, the phase grating 15 forms interference fringes of outputted (+)first-order diffracted light and (−)first-order diffracted light, whereby a refractive index modulating area corresponding to these interference fringes is formed in the optical waveguide region of optical fiber 90. The optical fiber 90 in which the refractive index modulating area is formed in the optical waveguide region acts a diffraction grating device.

The control unit 16 is constituted by a microcomputer, a memory, and the like. The control unit 16 is electrically connected to the light source 11, so as to control the intensity of refractive index modulation inducing light emitted from the light source 11. Also, the control unit 16 is electrically connected to the motor 14a of stage 14, so as to control the moving speed of mirror 13.

Figure 2:
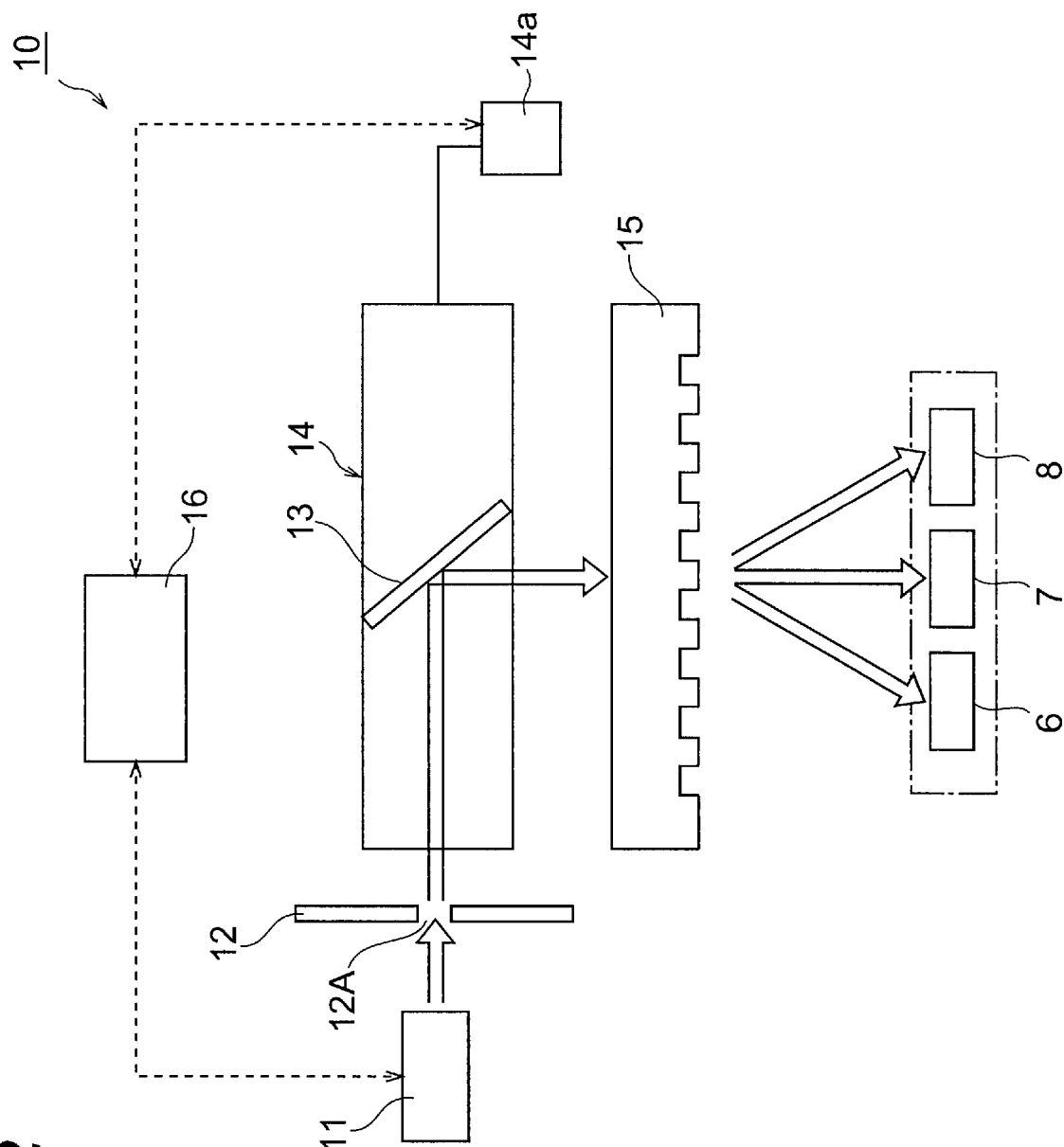
FIG. 2 is a view showing how the diffraction efficiency distribution of a phase grating is measured by the apparatus for making a diffraction grating device in accordance with the first embodiment.

In the method of making a diffraction grating device in accordance with this embodiment, the diffraction efficiency distribution of phase grating 15 is initially measured, and then a refractive index modulating area 94 is formed in the optical waveguide region of optical fiber 90 with the amount of irradiation of refractive index modulation inducing light at each position of the phase grating 15 being adjusted according to the measured diffraction efficiency distribution of phase grating 15. When measuring the diffraction efficiency distribution of phase grating 15, as shown in FIG. 2, the respective intensities of zero-order light, (+)first-order light, and (−)first-order light outputted from the phase grating 15 are measured by means of light-receiving devices 6 to 8 or the like in the apparatus 10 for making the diffraction grating device shown in FIG. 1 while the mirror 13 is moved in the longitudinal direction of optical fiber 90 by the stage 14 in the state without the optical fiber 90. Then, the diffraction efficiency distribution of phase grating 15 is determined according to the individual intensities. In this embodiment, the apparatus 10 for making a diffraction grating device may comprise the light-receiving devices 6 to 8.

When making the diffraction grating 94 in the optical waveguide region of optical fiber 90, the intensity of refractive index modulation inducing light emitted from the laser light source 11 so as to be made incident on the phase grating 15 is adjusted by the control unit 16 according to individual positions on the phase grating 15. Alternatively, the motor 14a of stage 14 is controlled by the control unit 16, so as to regulate the moving speed of mirror 13, such that the scanning speed of mirror 13 is adjusted according to the individual positions on the phase grating 15. Thus, the amount of irradiation of the refractive index modulation inducing light at each position of the phase grating 15 is adjusted. Here, the amount of irradiation of the refractive index modulation inducing light with respect to the phase grating 15 is adjusted so as to cancel the diffraction efficiency distribution of phase grating 15.

Figure 3A:
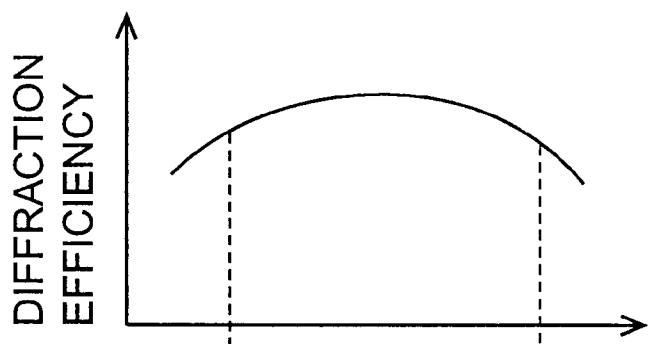
FIG. 3A is a graph showing the diffraction efficiency distribution of a phase grating for a first case.
Figure 3B:
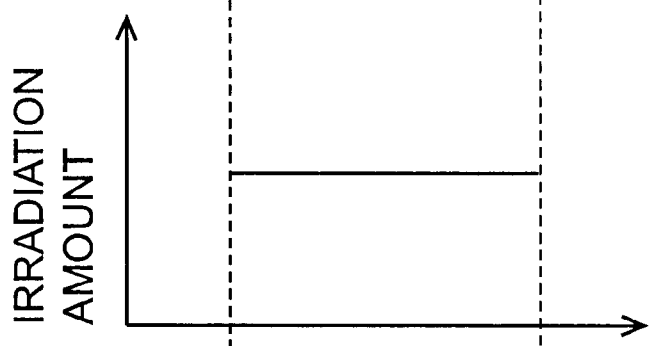
FIG. 3B is a graph showing a distribution of amount of irradiation of refractive index modulation inducing light with respect to the phase grating for the first case.
Figure 3C:
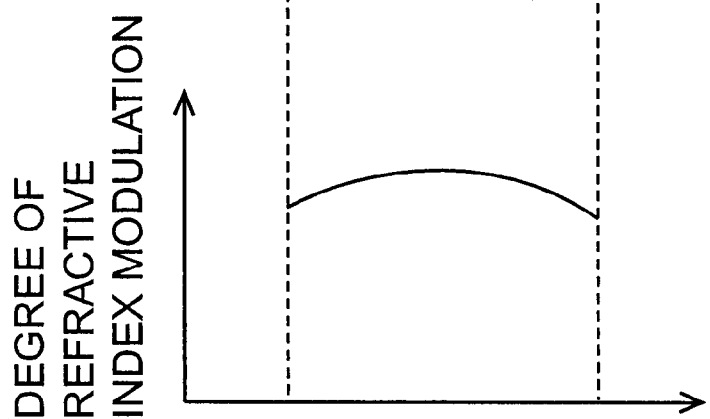
FIG. 3C is a graph showing the degree of refractive index modulation in an optical waveguide region of an optical fiber for the first case.
Figure 4A:
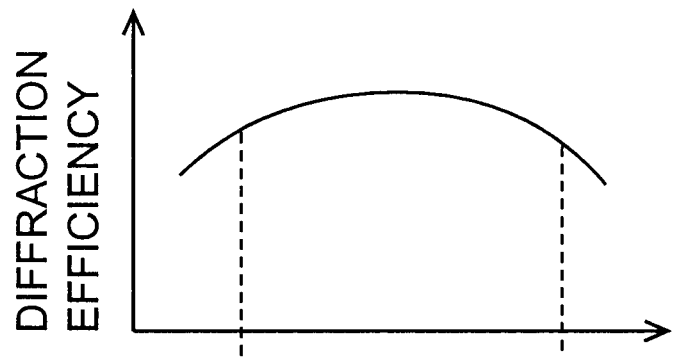
FIG. 4A is a graph showing the diffraction efficiency distribution of a phase grating for a second case.
Figure 4B:
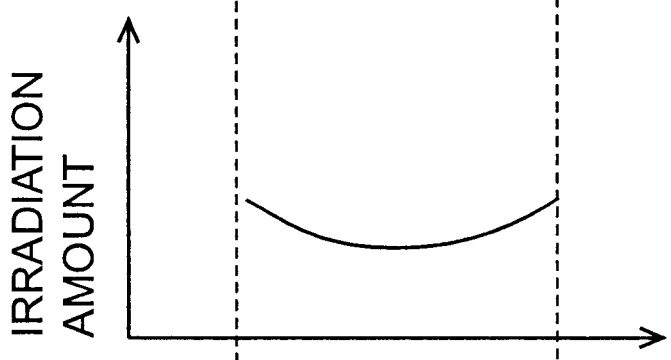
FIG. 4B is a graph showing a distribution of amount of irradiation of refractive index modulation inducing light with respect to the phase grating for the second case.
Figure 4C:
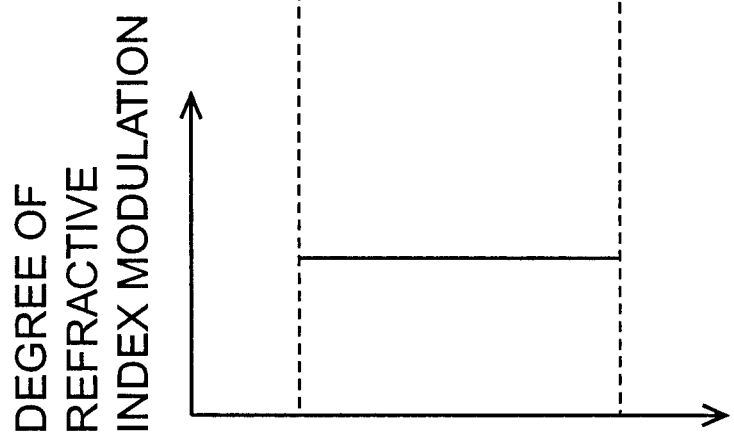
FIG. 4C is a graph showing the degree of refractive index modulation in an optical waveguide region of an optical fiber for the second case.
Figure 5A:
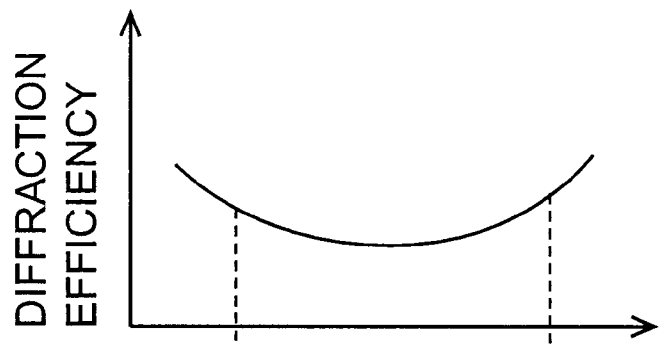
FIG. 5A is a graph showing the diffraction efficiency distribution of the phase grating for a third case.
Figure 5B:
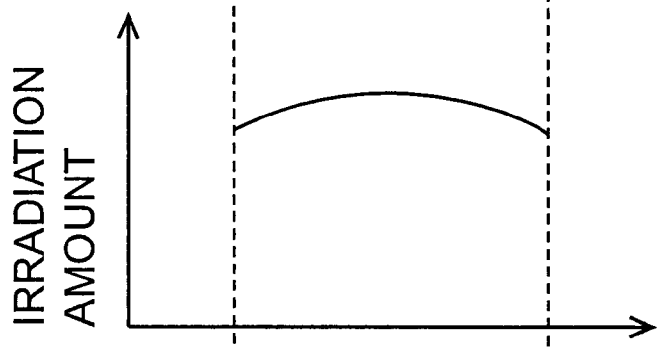
FIG. 5B is a graph showing a distribution of amount of irradiation of refractive index modulation inducing light with respect to the phase grating for the second case.
Figure 5C:
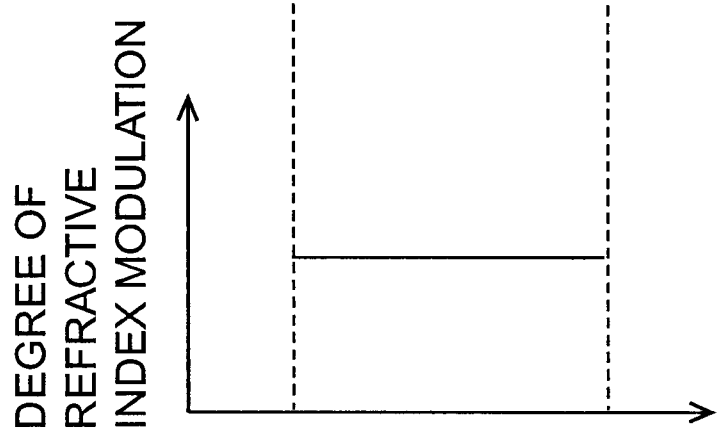
FIG. 5C is a graph showing the degree of refractive index modulation in an optical waveguide region of an optical fiber for the third case.

FIGS. 3A, 4A, and 5A are graphs showing respective diffraction efficiency distributions of the phase grating 15 for first to third cases. FIGS. 3B, 4B, and 5B are graphs showing respective distributions of amount of irradiation of refractive index modulation inducing light with respect to the phase grating 15 for these cases. FIGS. 3C, 4C, and 5C are graphs showing respective degrees of refractive index modulation in the optical waveguide region of optical fiber 90 for these cases.

In the first case, as shown in FIG. 3A, the diffraction efficiency of phase grating 15 is the highest in the vicinity of the center of the phase grating 15 in the longitudinal direction thereof and decreases toward its marginal areas. Here, the amount of irradiation of refractive index modulation inducing light with respect to the phase grating 15 is adjusted so as to become uniform in the longitudinal direction as shown in FIG. 3B. Then, the degree of refractive index modulation in the optical waveguide region of optical fiber 90 is the highest in the vicinity of the center of the phase grating 15 in the longitudinal direction thereof and decreases toward its marginal areas as shown in FIG. 3C, thus becoming nonuniform.

As shown in FIG. 4A, the diffraction efficiency of phase grating 15 is the highest in the vicinity of the center of the phase grating 15 in the longitudinal direction thereof and decreases toward its marginal areas in the second case as well. However, unlike the first case, the amount of irradiation of refractive index modulation inducing light with respect to the phase grating 15 in the second case is adjusted so as to cancel the diffraction efficiency distribution of phase grating 15, i.e., so as to become the lowest in the vicinity of the center in the longitudinal direction thereof and increase toward its marginal areas as shown in FIG. 4B. As a consequence, the degree of refractive index modulation in the optical waveguide region of optical fiber 90 becomes longitudinally uniform as shown in FIG. 4C.

In the third case, the diffraction efficiency of phase grating 15 is the lowest in the vicinity of the center in the longitudinal direction thereof and increases toward its marginal areas as shown in FIG. 5A. The amount of irradiation of refractive index modulation inducing light with respect to the phase grating 15 in the third case is adjusted so as to cancel the diffraction efficiency distribution of phase grating 15, i.e., so as to become the highest in the vicinity of the center in the longitudinal direction thereof and decrease toward its marginal areas as shown in FIG. 5B. As a consequence, the degree of refractive index modulation in the optical waveguide region of optical fiber 90 becomes longitudinally uniform as shown in FIG. 5C.

Figure 6:
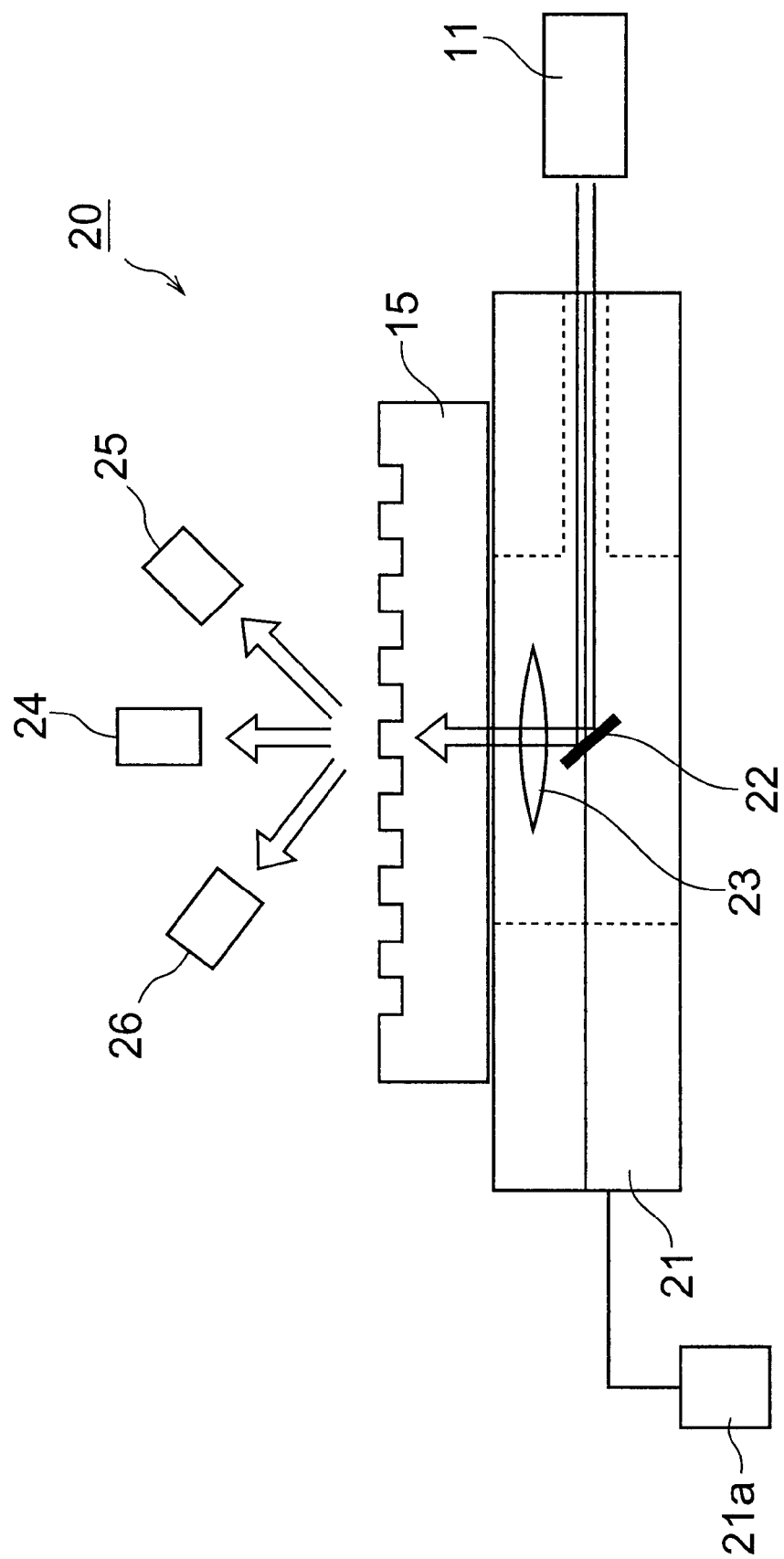
FIG. 6 is a diagram schematically showing a diffraction efficiency distribution measuring unit for measuring the diffraction efficiency distribution of a phase grating.

The diffraction efficiency distribution of phase grating 15 may be measured by means of the apparatus 10 for making a diffraction grating device shown in FIGS. 1 and 2, or a diffraction efficiency distribution measuring unit separate therefrom. FIG. 6 is a schematic diagram showing a diffraction efficiency distribution measuring unit 20 for measuring the diffraction efficiency distribution of phase grating 15.

The diffraction efficiency distribution measuring unit 20 comprises a stage 21 mounting the phase grating 15 and having a motor 21a for moving the latter; a mirror 22 for causing the refractive index modulation inducing light outputted from the laser light source 11 to be incident on the phase grating 15; a condenser lens 23; and light-receiving devices 24 to 26 for measuring the respective intensities of zero-order light, (+)first-order diffracted light, and (−)first-order diffracted light outputted from the phase grating 15.

In the diffraction efficiency distribution measuring apparatus 20, the refractive index modulation inducing light outputted from the laser light source 11 is reflected by the mirror 22 and then is collected by the condenser lens 23, so as to irradiate the phase grating 15 mounted on the stage 21. The intensity of the zero-order light generated along with the irradiation of the phase grating 15 with the refractive index modulation inducing light is measured by the light-receiving device 24, the intensity of thus generated (+)first-order diffracted light is measured by the light-receiving device 25, and the intensity of thus generated (−)first-order diffracted light is measured by the light-receiving device 26. As the intensity of each diffracted light is measured while the phase grating 15 is moved by the stage 21, the diffraction efficiency distribution of phase grating 15 is determined.

The diffraction efficiency distribution measuring apparatus 20 may use other laser light sources in place of the laser light source 11 for outputting the refractive index modulation inducing light, and the diffraction efficiency distribution of phase grating 15 at the wavelength of refractive index modulation inducing light may be determined according to the diffraction efficiency distribution of phase grating 15 measured by use of these other laser light sources.

In this embodiment, as in the foregoing, the diffraction efficiency distribution of phase grating 15 is initially measured, and then diffraction grating 94 is formed in the optical waveguide region of optical fiber 90 with the amount of irradiation of refractive index modulation inducing light at each position of the phase grating 15 being adjusted according to the measured diffraction efficiency distribution of phase grating 15. As a consequence, even when the diffraction efficiency of phase grating 15 is not uniform within a plane, a diffraction grating device having a desirable characteristic can be made.

A second embodiment of the method of making a diffraction grating device in accordance with the present invention, diffraction grating device made by this method, and apparatus for making the same will now be explained.

Figure 7:
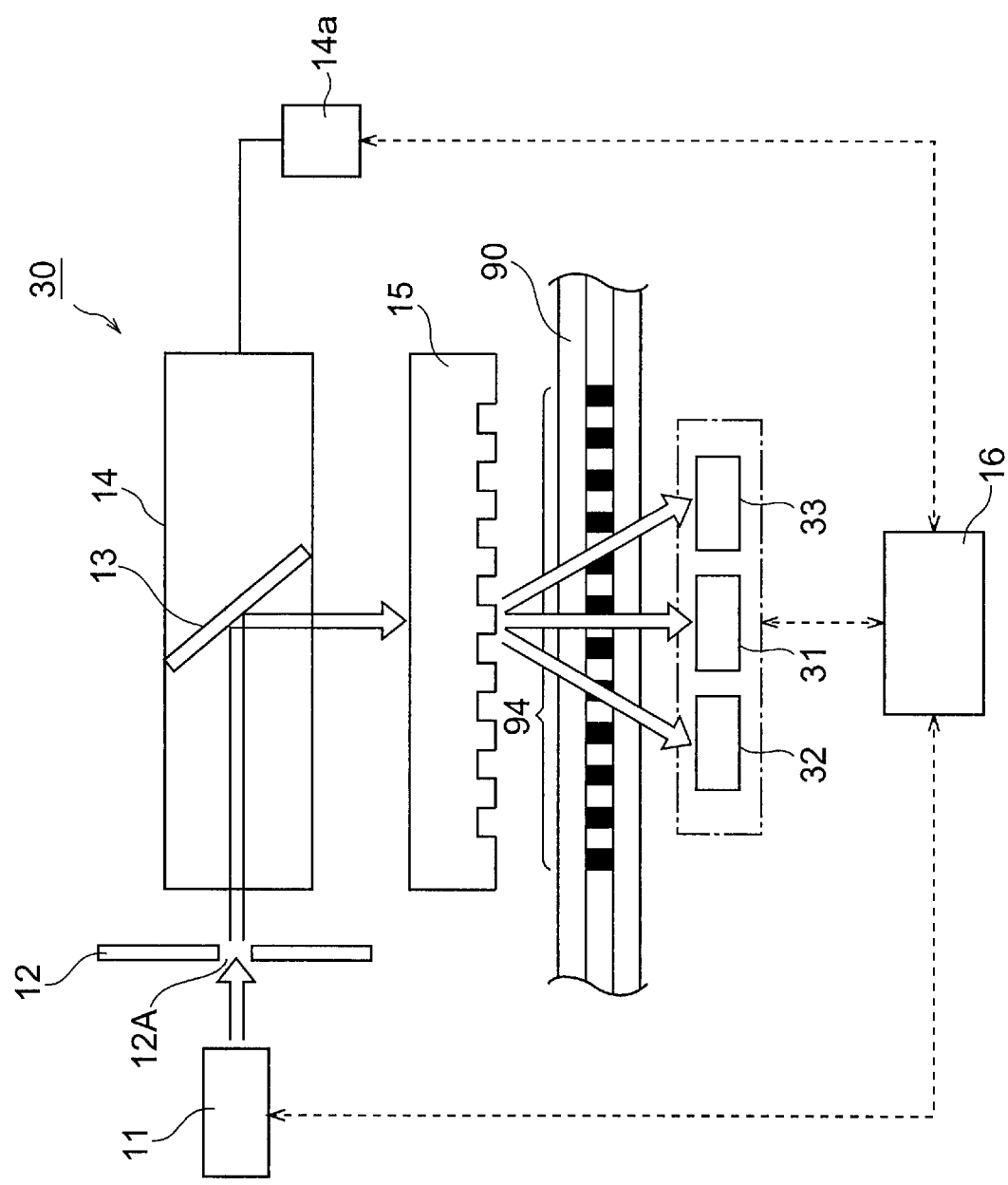
FIG. 7 is a diagram schematically showing the apparatus for making a diffraction grating device in accordance with a second embodiment.

FIG. 7 is a diagram schematically showing an apparatus 30 for making a diffraction grating device in accordance with the second embodiment. The apparatus 30 for making a diffraction grating device in accordance with this embodiment further comprises light-receiving devices 31 to 33 in addition to the apparatus 10 for making a diffraction grating device in accordance with the first embodiment.

Each of the light-receiving devices 31 to 33 is provided so as to sandwich the phase grating 15 between the mirror 13 and the respective light-receiving device, so that the optical fiber 90 is set between the phase grating 15 and the light-receiving devices 31 to 33. The light-receiving device 31 measures the intensity of the zero-order light generated along with the irradiation of phase grating 15 with the refractive index modulation inducing light. The light-receiving device 32 measures the intensity of the (+)first-order diffracted light generated along with the irradiation of phase grating 15 with the refractive index modulation inducing light. The light-receiving device 33 measures the intensity of the (−)first-order diffracted light generated along with the irradiation of phase grating 15 with the refractive index modulation inducing light. Thus, the diffraction efficiency distribution of phase grating 15 is determined according to the intensities of light received by the light-receiving devices 31 to 33.

In this embodiment, the diffraction efficiency distribution of phase grating 15 is measured at the same time when the refractive index of optical waveguide region in the optical fiber 90 is modulated, and the amount of irradiation of refractive index modulation inducing light at each position of the phase grating 15 is feedback-controlled according to thus measured diffraction efficiency distribution of phase grating 15.

Namely, when measuring the diffraction efficiency distribution of phase grating 15, the diffraction grating is formed in the optical waveguide region of optical fiber 90 while the mirror 13 is moved in the longitudinal direction of optical fiber 90 by the stage 14 in the state where the optical fiber 90 is set between the phase grating 15 and the light-receiving devices 31 to 33 in the apparatus 30 for making a diffraction grating device shown in FIG. 7. At the same time, the respective intensities of the zero-order light, (+)first-order light, and (−)first-order light outputted from the phase grating 15 are received by the light-receiving devices 31 to 33, and the diffraction efficiency distribution of phase grating 15 is determined according to thus received light intensities.

When forming the diffraction grating 94, the light source 11 is controlled by the control unit 16, such that the intensity of the refractive index modulation inducing light emitted from the laser light source 11 so as to be made incident on the phase grating 15 is adjusted according to the individual positions on the phase grating 15. Alternatively, the motor 14a of stage 14 is controlled by the control unit 16, so as to regulate the moving speed of mirror 13, such that the scanning speed of mirror 13 is adjusted according to the individual positions on the phase grating 15. Here, the amount of irradiation of refractive index modulation inducing light at each position on the phase grating 15 is feedback-controlled according to the measured diffraction efficiency distribution of phase grating 15 so as to cancel the diffraction efficiency distribution of phase grating 15.

In this embodiment, the relationship among the diffraction efficiency distribution of phase grating 15, the distribution of amount of irradiation of refractive index modulation inducing light with respect to the phase grating 15, and the degree of refractive index modulation is similar to that explained with reference to FIGS. 3A to 3C, 4A to 4C, and 5A to 5C in the first embodiment.

In this embodiment, as in the foregoing, the diffraction efficiency distribution of phase grating 15 is measured at the same time when the diffraction grating 94 is formed in the optical waveguide region of optical fiber 90, and the amount of irradiation of refractive index modulation inducing light at each position of the phase grating 15 is feedback-controlled according to thus measured diffraction efficiency distribution of phase grating 15. As a consequence, even when the diffraction efficiency of the phase grating 15 is not uniform within a plane, a diffraction grating device having a desirable characteristic can be made. In particular, a diffraction grating device having a desirable characteristic can be made in this embodiment even when the intensity of the refractive index modulation inducing light emitted from the laser light source 11 is unstable.

Here, when a plurality of signals at intervals of 0.4 nm (approximately equivalent to 50 GHz) are made incident on a fiber grating, there is a correlation between the value of reflection (side lobe) of the spectrum at a wavelength separated by 2 channels (0.8 nm) or more from the center wavelength of the fiber grating and the amount of fluctuation in diffraction efficiency of a phase grating used for making the fiber grating. Therefore, using a phase grating whose amount of fluctuation of zero-order diffraction efficiency is 0.35, the inventors studied the side lobe in each of a fiber grating made with the fluctuation of diffraction efficiency being corrected by the method of making a diffraction grating device in accordance with this embodiment and a fiber grating made without correcting the fluctuation of diffraction efficiency. The result indicates that, while the side lobe of the fiber grating made without correcting the fluctuation of diffraction efficiency is as much as about −22 dB, the side lobe of the fiber grating made with the fluctuation of diffraction efficiency being corrected is −28 dB or less, thereby improving a characteristic. The value of −28 dB or less is on a par with that of a side lobe obtained when the amount of fluctuation of zero-order diffraction efficiency is 0.01 or less.

Without being restricted to the above-mentioned embodiments, the present invention can be modified in various ways. For example, while the above-mentioned embodiments relate to the making of a diffraction grating device in which the degree of refractive index modulation in the optical waveguide region of optical fiber 90 is longitudinally uniform, the same also applies to the making of a diffraction grating device in which the degree of refractive index modulation has a predetermined distribution which is not longitudinally uniform.

Though the above-mentioned embodiments relate to the case where the optical waveguide is an optical fiber, the same also applies to planar optical waveguides formed on planar substrates.

Also, in addition to or in place of the respective intensities of zero-order light, (+)first-order diffracted light, and (−)first-order diffracted light, the respective intensities of (+)second-order diffracted light and (−)second-order diffracted light may be measured, so as to control the amount of irradiation of refractive index modulation inducing light according to these intensities.

According to the present invention, as explained in detail in the foregoing, the diffraction efficiency distribution of a phase grating is measured by diffraction efficiency distribution measuring means in a diffraction efficiency distribution measuring step. Then, in a refractive index modulating step, the amount of irradiation of refractive index modulation inducing light at each position on the phase grating is adjusted by refractive index modulating means according to thus measured diffraction efficiency distribution of phase grating, whereby a refractive index modulating area is formed in the optical waveguide region of an optical waveguide. Thus, even when the diffraction efficiency distribution of phase grating deviates from its desirable distribution, a diffraction grating device having a desirable characteristic is made.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method of making a diffraction grating device, in which an optical waveguide is irradiated, by way of a phase grating, with refractive index modulation inducing light capable of inducing a refractive index modulation in an optical waveguide region of said optical waveguide so as to form a diffraction grating in said optical waveguide region, said method comprising:

a diffraction efficiency distribution measuring step of measuring a diffraction efficiency distribution of said phase grating; and a refractive index modulating step of irradiating said optical waveguide with said refractive index modulation inducing light by way of said phase grating with an amount of irradiation of said refractive index modulation inducing light at each position on said phase grating being adjusted according to said diffraction efficiency distribution measured in said diffraction efficiency distribution measuring step, so as to modulate a refractive index of said optical waveguide region.

2. A method of making a diffraction grating device according to claim 1, wherein said diffraction efficiency distribution measuring step is carried out prior to said refractive index modulating step.

3. A method of making a diffraction grating device according to claim 1, wherein said diffraction efficiency distribution measuring step is carried out simultaneously with said refractive index modulating step; and wherein said amount of irradiation of refractive index modulation inducing light at each position on said phase grating is feedback-controlled according to said diffraction efficiency distribution of phase grating measured in said diffraction efficiency distribution measuring step.

4. A method of making a diffraction grating device according to claim 1, wherein said refractive index modulation inducing light is made incident on said phase grating while being scanned in a longitudinal direction of said optical waveguide in said refractive index modulating step, and the intensity of said refractive index modulation inducing light irradiating each position on said phase grating is adjusted upon said scanning.

5. A method of making a diffraction grating device according to claim 1, wherein said refractive index modulation inducing light is made incident on said phase grating while being scanned in a longitudinal direction of said optical waveguide in said refractive index modulating step, and the scanning speed of said refractive index modulation inducing light irradiating each position on said phase grating is adjusted upon said scanning.

6. A diffraction grating device made by the method of making a diffraction grating device according to claim 1.

7. An apparatus for making a diffraction grating device, in which an optical waveguide is irradiated, by way of a phase grating, with refractive index modulation inducing light capable of inducing a refractive index modulation in an optical waveguide region of said optical waveguide so as to form a diffraction grating in said optical waveguide region, said apparatus comprising:

diffraction efficiency distribution measuring means for measuring a diffraction efficiency distribution of said phase grating; and refractive index modulating means for irradiating said optical waveguide with said refractive index modulation inducing light by way of the phase grating with an amount of irradiation of said refractive index modulation inducing light at each position on said phase grating being adjusted according to said diffraction efficiency distribution measured by said diffraction efficiency distribution measuring means, so as to modulate a refractive index of said optical waveguide region.

8. An apparatus for making a diffraction grating device according to claim 7, wherein said diffraction efficiency distribution measuring means measures said diffraction efficiency distribution of said phase grating before said refractive index modulating means irradiates said phase grating with said refractive index modulation inducing light.

9. An apparatus for making a diffraction grating device according to claim 7, wherein said diffraction efficiency distribution measuring means measures said diffraction efficiency distribution of said phase grating at the same time when said refractive index modulating means irradiates said phase grating with said refractive index modulation inducing light; and wherein said refractive index modulating means feedback-controls said amount of irradiation of refractive index modulation inducing light at each position on said phase grating according to said diffraction efficiency distribution of phase grating measured by said diffraction efficiency distribution measuring means.

10. An apparatus for making a diffraction grating device according to claim 7, wherein said refractive index modulating means comprises:

irradiating means for making said refractive index modulation inducing light incident on said phase grating while scanning said refractive index modulation inducing light in a longitudinal direction of said optical waveguide; and irradiation intensity adjusting means for adjusting the intensity of said refractive index modulation inducing light irradiating each position on said phase grating when said refractive index modulation inducing light is scanned by said irradiating means.

11. An apparatus for making a diffraction grating device according to claim 7, wherein said refractive index modulating means comprises:

irradiating means for making said refractive index modulation inducing light incident on said phase grating while scanning said refractive index modulation inducing light in a longitudinal direction of said optical waveguide; and scanning speed adjusting means for adjusting the scanning speed of said refractive index modulation inducing light irradiating each position on said phase grating when said refractive index modulation inducing light is scanned by said irradiating means.

12. An apparatus for making a diffraction grating device, in which a diffraction grating is made in an optical waveguide region of an optical waveguide, said apparatus comprising:

a light source for emitting refractive index modulation inducing light capable of inducing a refractive index modulation in said optical waveguide region;

a phase grating for diffracting said refractive index modulation inducing light emitted from said light source;

a mirror for reflecting said refractive index modulation inducing light emitted from said light source so as to make said refractive index modulation inducing light incident on said phase grating;

a moving unit for moving said mirror along a longitudinal direction of said optical waveguide; and a speed control unit for controlling, according to a diffraction efficiency distribution of said phase grating, the moving speed of said mirror moved by said moving unit.

13. An apparatus for making a diffraction grating device according to claim 12, further comprising a light-receiving device, for measuring the intensity of light, provided so as to sandwich said phase grating together with said mirror.

14. An apparatus for making a diffraction grating device, in which a diffraction grating is made in an optical waveguide region of an optical waveguide, said apparatus comprising:

a light source for emitting refractive index modulation inducing light capable of inducing a refractive index modulation in said optical waveguide region;

a phase grating for diffracting said refractive index modulation inducing light emitted from said light source;

a mirror for reflecting said refractive index modulation inducing light emitted from said light source so as to make said refractive index modulation inducing light incident on said phase grating;

a moving unit for moving said mirror along a longitudinal direction of said optical waveguide; and an irradiation intensity control unit for controlling, according to diffraction efficiency distribution of said phase grating, the irradiation intensity of said refractive index modulation inducing light emitted from said light source.

15. An apparatus for making a diffraction grating device according to claim 13, further comprising a light-receiving device, for measuring the intensity of light, provided so as to sandwich said phase grating together with said mirror.

* * * * *